Dec. 23, 1958 — A. B. MONNIG — 2,865,596
PLASTIC VALVE
Filed June 23, 1954 — 2 Sheets-Sheet 1

INVENTOR.
Anthony B. Monnig.
BY Wood, Herron & Evans.
ATTORNEYS.

Dec. 23, 1958 A. B. MONNIG 2,865,596
PLASTIC VALVE

Filed June 23, 1954 2 Sheets-Sheet 2

INVENTOR.
Anthony B. Monnig.
BY Wood, Herron & Evans.
ATTORNEYS.

2,865,596

PLASTIC VALVE

Anthony Bernard Monnig, Cincinnati, Ohio, assignor to The Lunkenheimer Company, Cincinnati, Ohio, a corporation of Ohio Application June 23, 1954, Serial No. 438,646

3 Claims. (Cl. 251—175)

This invention relates to valves and particularly to plastic valves for controlling the flow of fluid in a conduit. At present, plastic valves are being used in conduit systems which handle chemicals which are corrosive to metal and chemicals which are contaminated by contact with metal. For instance, in the food industry, taste is often affected by contact of the foodstuff with metal; and in handling delicate pharmaceuticals, slight degradation or decomposition or color-darkening may be caused by contact with metals.

At the present time, a wide variety of plastics is available for the fabrication of conduit systems, including the necessary valves, and in almost every instance in which the use of metal is undesirable, one or another specific plastic is available which has the required specific inertness in respect to the fluid to be handled. In the past, it has been the practice to fabricate plastic valves to correspond in structure with the common types of metal valves. It is the object of this invention to provide a valve structure which is particularly adapted to be fabricated with the least number of parts by means of plastic molding techniques which are now well known and in common use. A further object of this invention is to provide a plastic valve of the specified characteristics which requires little or no machining operations to provide a finished valve which seals completely and reliably upon the application of an amount of force which is comparatively small in comparison with the force commonly used to close metal valves.

The valve of this invention, apart from the packing, consists of two elements, each a plastic molding, adapted to be fabricated completely by a single molding operation without additional machining or finishing operations. This valve consists of an axial valve body having an inlet conduit extending from one end and a co-axial outlet conduit from the other end. The axial valve body comprises a co-axial circular sealing flange adjacent to the outlet conduit and a co-axial, circular-threaded barrel adjacent to the inlet conduit, the flange and barrel spaced apart axially by a circular co-axial neck of lesser diameter than either the flange or barrel. The barrel is of greater diameter than the sealing flange. The valve body is provided with apertures which connect the inlet conduit to the gap between the barrel and sealing flange. The outlet conduit is connected by passageways to the outlet side of the sealing flange so that the conduit is interrupted by the solid valve body and the inlet and outlet conduits are both connected to the exterior of the valve body on opposite sides of the sealing flange.

Cooperating with this axial valve body to complete the valve structure is a tapered sleeve which is screw threaded over the barrel and extends over the sealing flange and slidingly engages the outlet conduit. Thus, when the sleeve is rotated on the barrel in the direction to translate it toward the inlet conduit, the tapered portion of the sleeve engages the sealing flange which blocks the flow of fluid. Reverse rotation opens the valve. Thus, two elements of molded plastic combine to constitute a valve which is complete, except for packing.

The valve structure of this invention may be fabricated from any plastic which has the structural strength required to withstand the pressure employed in the conduit system, the choice of plastic being dependent upon the specific chemical inertness which is desired.

Thus, the valve may be molded from polyvinyl chloride, the copolymer of polyvinyl chloride and polyvinyl acetate, other polyvinyl halides, such as polyvinyl fluoride, the phenolic resins, hard rubber, the methylmethacrylate resins, alone or copolymerized with vinyl halides, nitrocellulose, cellulose acetate, polyamids, the urea resins, and even the softer resins such as polyethylene when appropriately reinforced with glass fibers or the like.

The following is a list of resins which are among those found especially suitable for the construction of valves:

| Trade name | Modulus of elasticity |
|---|---|
| Nylon | $4.0 \times 10^5$ |
| Exon | $5-6 \times 10^5$ |
| Lucite | $3.5-5 \times 10^5$ |
| Teflon [1] | $2-10 \times 10^5$ |
| Alathon polyethylene [1] | $2-10 \times 10^5$ |
| Saron [1] | $2-10 \times 10^5$ |

[1] These materials are reinforced by a filler or impregnant so that the composition has a modulus of elasticity of the order given.

It is to be understood that the above list of resins is intended to be exemplary, but not inclusive.

In general, the plastics or synthetic resins have a modulus of elasticity which is low in comparison with the modulus of elasticity of metals. In general, the modulus of elasticity of the metals used for valve structures is from 20 to 100 times as high as that of the synthetic resins and plastics of the type indicated. The valves of the present invention may be fabricated from plastics having a modulus of elasticity from 2 on up to the highest modulus of elasticity which plastic compositions provide. However, machining or finishing operations may be required if the modulus of elasticity exceeds 10. In other words, the tolerances to which plastics are conventionally molded run from about one-thousandth of an inch up to four- or five-thousandths of an inch. For most molding operations and most valve sizes a modulus of elasticity of substantially 3 to 10 compensates for inaccuracies in the molding operation. For instance, if either the sealing flange or the sleeve is less than perfectly true, the imperfection need not be corrected by accurate machining because the valve seals completely by virtue of the elasticity of the plastic. However, the valve structure of this invention may be fabricated from inelastic plastic or even metal if appropriate machining and finishing is employed.

This invention will be better understood in relation to the description of the accompanying drawing, in which.

Figure 4:
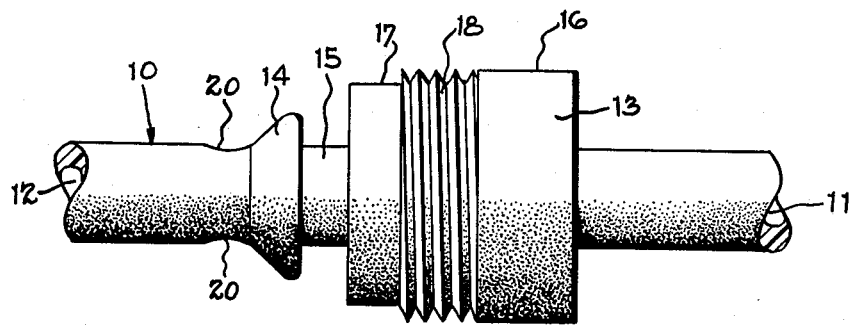
Figure 4 is a side elevation of the stem.
Figure 5:
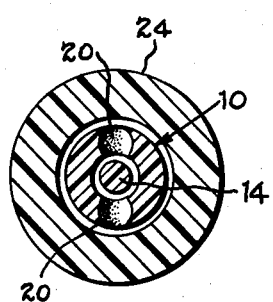
Figure 5 is a sectional view taken on line 5—5 of Figure 2.
Figure 6:
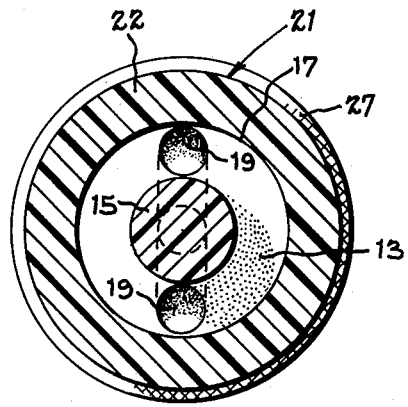
Figure 6 is a sectional view taken on line 6—6 of Figure 2.

In the drawing, the axial valve body 10 is constituted by a unitary plastic molding which is shown in Figure 4 of the drawing. This valve body is axial in the sense that it is circular in cross section over its full length and has a single axis which is common to all diameters. This axial valve body has an inlet conduit 11 at one end and an outlet conduit 12 at the other end. These conduits are connected in a conduit system. The valve body in between the inlet and outlet conduits includes a barrel 13 adjacent to the inlet conduit and a sealing flange 14 adjacent to the outlet conduit, the sealing flange of narrower diameter than the barrel and spaced therefrom by a neck 15. The barrel is provided with a bearing surface 16 on the inlet side thereof, a bearing surface 17 of slightly lesser diameter than bearing surface 16, bearing surface 17 being disposed adjacent to the neck, and a screw-threaded portion 18 which is intermediate said bearing surfaces.

The axial valve body 10 is configured to provide passageways 19 from the inlet conduit to the space between the barrel and the sealing flange and also passageways 20 between the interior of outlet conduit and the exterior of the outlet conduit, at a point just on the outlet side of the sealing flange. This valve body may be molded as a single piece from synthetic resin. If desired, the passageways in the axial valve body may be drilled, but the valve body is so designed that the passageways may be formed in the molding operation by use of insertable pins in the mold, a technique which is very conventional in the molding of plastics.

The element which cooperates with the axial valve body to provide a valve is sleeve 21 which may also be molded from synthetic resin. This sleeve has a large end 22, a small end 23 and a tapered wall 24 in between them. This sleeve is annular and is provided with internal screw threading 25, which is adapted to cooperate with the screw threading on the barrel, whereby rotation on the sleeve translates it toward the inlet or toward the outlet side of the axial valve body, depending upon the direction of the rotation. The large end of the sleeve is provided with internal packing 26 and adjustment nut 27 to press the packing against bearing surface 16 of the barrel. The small end of the sleeve is provided with packing 29 and adjustment nut 30, the packing being adapted to engage and slide upon the outlet conduit of the axial valve body.

As disclosed, the tapered wall 24 is heavier than the margin of the sealing flange, so that the internal pressure in the valve on the inlet side of the sealing flange tends to flex the sealing flange into tighter engagement with the tapered wall of the sleeve. If the wall tended to flex more readily than the edge of the flange, then the valve would tend to leak. If desired, the sealing flange may be made of further reduced cross section to render it more flexible. If desired, the valve may be mounted in the conduit system to provide a flow of fluid through the valve in the direction opposite to that herein disclosed, but it is to be noted that the internal pressure within the valve would then operate to induce leakage rather than sealing. However, with a relatively rigid valve structure and low pressures the reverse flow might not actually produce leakage.

The sleeve, like the axial valve body, is adapted to be molded of synthetic resin in a single molding operation, except for the packing and packing nuts. For the convenience of the operator, the sleeve is provided with a knurled exterior 31.

In normal operation, the fluid in the conduit system enters the valve through inlet conduit 11, then passes through passageways 19 to the outlet side of the barrel in the vicinity of the neck 15. If the valve is in open position with the sleeve, adjusted toward the outlet side of the valve, the fluid passes about the periphery of sealing flange 14, then through passageways 20 to the interior of the outlet conduit. If the sleeve is rotated in the direction to translate the sleeve toward the inlet side of the valve, tapered wall 24 advances upon and engages sealing flange 14 adjacent to its periphery, which closes the passageway between the inlet and outlet sides of the sealing flange.

Figure 1:
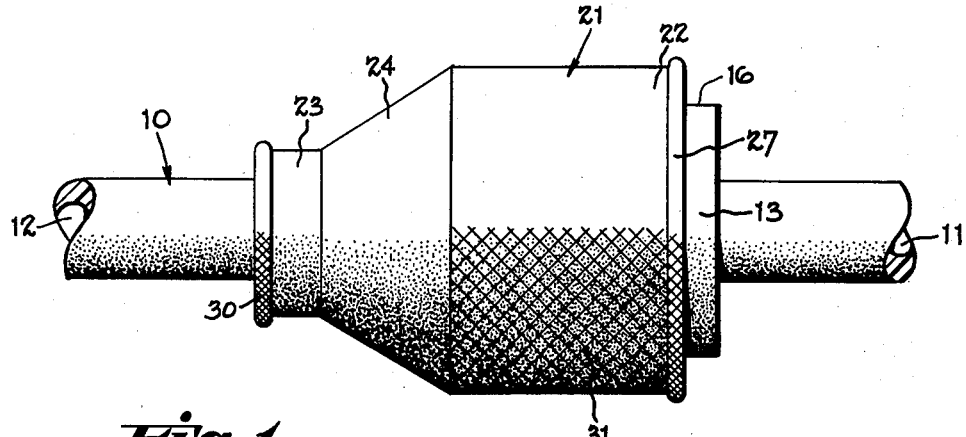
Figure 1 is a side elevation of the valve.
Figure 2:
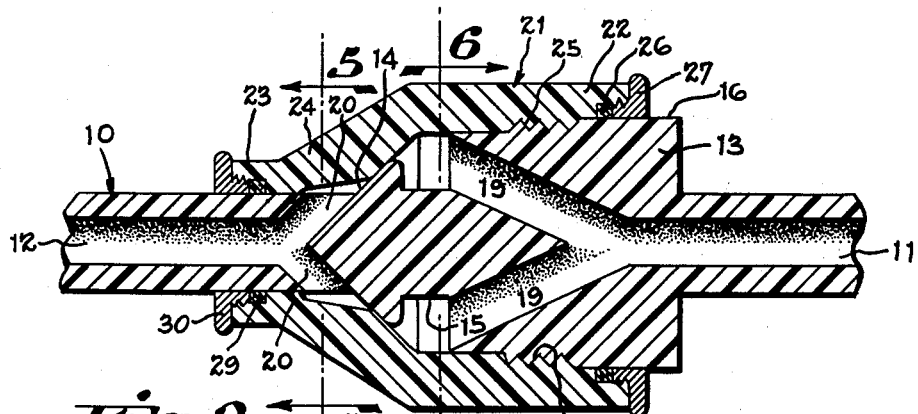
Figure 2 is a longitudinal sectional view of the valve in closed position.
Figure 3:
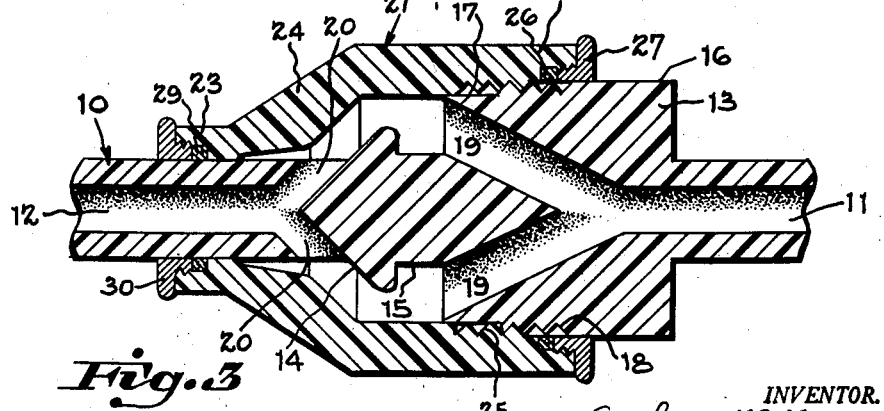
Figure 3 is a longitudinal sectional view of the valve in open position.

As shown particularly in Figure 3, when the sleeve is in the open position, only a minimum resistance is presented to fluid flow. More specifically, the resistance to fluid flow is substantially reduced by arranging passageways 19 formed in the barrel so that these passageways are disposed at an acute angle to the inlet conduit, and arranging the passageways in communication with the outlet conduit so that they are disposed at an acute angle relative to that conduit. Preferably these passageways are angulated the same amount as the face of the sealing flange and the tapered wall of the sleeve. In addition, the sleeve defines a chamber surrounding the sealing flange which is of greater cross section area than either the passageways connected to the inlet conduit or those connected to the outlet conduit. It is apparent from the embodiment shown that the direction of the fluid is never changed by more than 45° at any one time so that the fluid in effect flows in a generally arcuate path, rather than a path including a plurality of abrupt right angle turns as in most valves.

From the foregoing discussion of the general principles of the invention and a disclosure of the preferred embodiment, those skilled in the art will readily comprehend the various modifications to which the invention is susceptible. For example, while the sleeve 17 has been shown as threadably engaging the barrel, the threads can be omitted and these members can be disposed in slidable engagement with one another. In such a modification, detent or other means can be provided for releasably holding the sleeve in either its closed position in engagement with the sealing flange, or in its open position spaced from that flange. Furthermore, if desired, a toggle or other linkage can be mounted on one of the fluid conduits for mechanically translating the sleeve from one position to another.

Having described my invention, I desire to be limited only by the following claims:

1. A valve comprising an axial valve body constituted by a unitary synthetic resin molding, said axial valve body including a tubular inlet conduit adapted for connection to an inlet line, a tubular outlet conduit adapted for connection to an outlet line, a barrel of greater diameter than the inlet conduit and adjacent thereto, a substantially conical sealing flange of lesser diameter than the barrel, said conical sealing flange adjacent to and tapering toward said outlet conduit and spaced from said barrel to provide a neck of reduced diameter between them, said axial valve body being provided with passageways through said barrel connecting the inlet conduit to the space intermediate the barrel and sealing flange, said axial valve body being provided with passageways connecting the outlet conduit to the exterior of the body on the outlet side of the sealing flange, and a multidiameter, plastic sleeve having a portion of greater diameter screw threaded over the barrel, and a portion of lesser diameter slidably engaged over the outlet conduit, and a tapered wall between said portion of greater diameter and said portion of lesser diameter, said sealing flange being sufficiently flexible so as to deform under normal operating pressure into increased sealing contact with said tapered wall when said valve is closed, said wall having greater rigidity than the conical sealing flange and being sufficiently rigid to provide a seating surface for the flange, said wall adapted, on translation of the sleeve by rotation, to sealingly engage with and disengage from the sealing flange, thereby closing and opening the valve.

2. A valve adapted for insertion in a rigid line, said valve comprising a body constituted by a unitary synthetic resin molding, said body including a first tubular conduit adapted for connection to an inlet line, and a second tubular conduit adapted for connection to an outlet line, a barrel of greater diameter than the first tubular conduit disposed intermediate said conduits, a sealing flange of lesser diameter than the barrel, said sealing flange being disposed adjacent to said second conduit in spaced relationship with said barrel, a neck of reduced diameter interconnecting the barrel and sealing flange, said barrel including passageways interconnecting the first conduit to the space intermediate the barrel and flange, said passageways being disposed at an acute angle to said first conduit, passageways connecting the second conduit to the exterior of the body on the outlet side of the sealing flange, said last named passageways being disposed at acute angles to said second conduit, and a multi-diameter sleeve, including a portion of greater diameter in engagement with the barrel, a portion of lesser diameter slidably engaging the second conduit, and a tapered wall of intermediate diameter, said tapered wall being sufficiently rigid to provide a seating surface for the sealing flange and being adapted on translation of the sleeve to sealingly engage the sealing flange of the valve body to prevent fluid flow from the first conduit to the second conduit, said sealing flange being sufficiently flexible so as to deform under normal operating pressure into increased sealing contact with said tapered wall when said valve is closed, said sleeve being effective to define with said sealing flange, a chamber of greater cross sectional area than the cross sectional area of the passageways communicating with the first conduit.

3. A valve adapted for insertion in a rigid line, said valve comprising a synthetic resin body formed entirely by molding, said body including a first tubular conduit adapted for connection to an inlet line, and a second tubular conduit adapted for connection to an outlet line, a barrel of greater diameter than the first tubular conduit disposed intermediate said conduits, a sealing flange of lesser diameter than the barrel, said sealing flange being disposed adjacent to said second conduit in spaced relationship with said barrel, a neck of reduced diameter interconnecting the barrel and sealing flange, said barrel including passages interconnecting the first conduit to the space intermediate the barrel and flange, passageways connecting the second conduit to the exterior of the body on the outlet side of the sealing flange, and a multi-diameter sleeve, said sleeve being formed of synthetic resin configurated entirely by molding and including a portion of greater diameter in engagement with the barrel, a portion of lesser diameter slidably engaging the second conduit, and a tapered wall of intermediate diameter adapted on translation of the sleeve to engage the sealing flange of the valve body to prevent fluid flow from the first conduit to the second conduit said sealing flange being sufficiently flexible so as to deform under normal operating pressure into increased sealing contact with said tapered wall when said valve is closed, said tapered wall being sufficiently rigid to provide a seating surface for the sealing flange.

References Cited in the file of this patent

UNITED STATES PATENTS

| | | |
|---|---|---|
| 495,064 | Schrader | Apr. 11, 1893 |
| 1,423,418 | Grikscheit | July 18, 1922 |
| 2,245,097 | Tobler | June 10, 1941 |
| 2,278,313 | Hornbostel | Mar. 31, 1942 |
| 2,295,774 | Corydon | Sept. 15, 1942 |
| 2,343,584 | Scheele | Mar. 7, 1944 |
| 2,368,927 | Kiene | Feb. 6, 1945 |
| 2,458,809 | Twardowski | Jan. 11, 1949 |
| 2,661,019 | Snyder | Dec. 1, 1953 |

FOREIGN PATENTS

| | | |
|---|---|---|
| 897,499 | Germany | 1953 |